(12) United States Patent
Pimmel et al.

(10) Patent No.: US 9,641,884 B2
(45) Date of Patent: May 2, 2017

(54) METHOD AND DEVICE FOR ESTABLISHING A CONTENT MIRRORING SESSION

(75) Inventors: Kim P. Pimmel, San Francisco, CA (US); Marcos Weskamp, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2256 days.

(21) Appl. No.: 12/271,858

(22) Filed: Nov. 15, 2008

(65) Prior Publication Data

US 2014/0032635 A1    Jan. 30, 2014

(51) Int. Cl.
| | |
|---|---|
| H04L 29/08 | (2006.01) |
| H04N 21/41 | (2011.01) |
| H04M 1/725 | (2006.01) |
| H04N 21/422 | (2011.01) |
| H04N 21/4223 | (2011.01) |
| H04N 21/436 | (2011.01) |
| H04N 21/44 | (2011.01) |
| H04N 21/442 | (2011.01) |
| H04N 21/45 | (2011.01) |
| H04N 21/4788 | (2011.01) |
| G06F 3/0484 | (2013.01) |

(52) U.S. Cl.
CPC ..... *H04N 21/4126* (2013.01); *H04L 67/1095* (2013.01); *H04M 1/7253* (2013.01); *H04N 21/4223* (2013.01); *H04N 21/42202* (2013.01); *H04N 21/42204* (2013.01); *H04N 21/42225* (2013.01); *H04N 21/43615* (2013.01); *H04N 21/44008* (2013.01); *H04N 21/44227* (2013.01); *H04N 21/4508* (2013.01); *H04N 21/4524* (2013.01); *H04N 21/4788* (2013.01); *G06F 3/04842* (2013.01); *H04M 2250/04* (2013.01)

(58) Field of Classification Search
CPC ............ G06F 3/04842; H04L 67/1095; H04M 1/7253; H04M 2250/04; H04M 2250/64
USPC ....... 709/201, 204, 205, 209, 211, 212, 216, 709/217, 218, 220, 222, 223, 224, 227, 709/231, 237
See application file for complete search history.

(56) References Cited

U.S. PATENT DOCUMENTS

| | | | |
|---|---|---|---|
| 6,208,373 B1* | 3/2001 | Fong ...................... | H04N 7/144 348/14.03 |
| 7,920,158 B1* | 4/2011 | Beck .................. | H04N 5/23219 348/14.08 |
| 2004/0143603 A1* | 7/2004 | Kaufmann ............... | G09B 5/08 |
| 2004/0143630 A1* | 7/2004 | Kaufmann ............... | G09B 7/02 709/205 |

(Continued)

*Primary Examiner* — Barbara Burgess
(74) *Attorney, Agent, or Firm* — Shook, Hardy & Bacon L.L.P.

(57) ABSTRACT

Computer-based methods and devices for establishing a content mirroring session during which two devices concurrently present or display the same content are disclosed. Consistent with an embodiment of the invention, a first device displays a visual indicator when the first device is physically positioned and oriented to target a second device, with which the first device is authorized to establish a content mirroring session. The visual indicator, which may be a graphical user interface element such as a button or icon, identifies the device that is being targeted by the first device, and in some embodiments, indicates to a user that a content mirroring session can be established with the targeted device.

24 Claims, 15 Drawing Sheets

(56) References Cited

U.S. PATENT DOCUMENTS

| | | | | |
|---|---|---|---|---|
| 2004/0153504 | A1* | 8/2004 | Hutchinson | G06F 17/30017 709/204 |
| 2005/0097185 | A1* | 5/2005 | Gibson | H04L 29/06 709/217 |
| 2005/0188062 | A1* | 8/2005 | Li | H04W 8/005 709/220 |
| 2007/0239981 | A1* | 10/2007 | Lessing | G06K 7/10237 713/164 |
| 2008/0010501 | A1* | 1/2008 | Bucher | H04L 67/1095 714/6.11 |
| 2008/0225109 | A1* | 9/2008 | Lee | H04N 7/15 348/14.02 |
| 2009/0019492 | A1* | 1/2009 | Grasset | G11B 27/034 725/45 |
| 2009/0034498 | A1* | 2/2009 | Banerjea | H04W 76/025 370/338 |
| 2009/0175260 | A1* | 7/2009 | Wang | H04W 56/001 370/350 |
| 2010/0234044 | A1* | 9/2010 | Lohbihler | G01S 5/02 455/456.1 |

* cited by examiner

METHOD AND DEVICE FOR ESTABLISHING A CONTENT MIRRORING SESSION

TECHNICAL FIELD

The present disclosure generally relates to content mirroring. Some example embodiments of the present disclosure relate to methods and computing devices for targeting, with a mobile computing device, the display of another device so as to establish a content mirroring session, during which some content presented at the targeted device is also presented (e.g., mirrored) at the mobile computing device.

BACKGROUND

It is not uncommon for modern homes and offices to have several sophisticated computing devices with advanced processing, networking, and display capabilities. For example, digital cameras are able to send digital photos, and digital picture frames are able to receive digital photos, via wireless networks. Flat panel television displays are designed with built-in processors and networking devices for receiving, processing and displaying content from other network-enabled devices. Mobile handsets, which have traditionally been used primarily for making telephone calls, now include powerful processors, touch screen displays, location and image sensors and advanced networking capabilities for executing a variety of software applications. Many of these computing devices require significant technical knowledge and effort to configure and operate for effective use. Unfortunately, as the functionality of these computing devices increases, so too will their overall complexity.

One particular problem that often arises involves configuring a device so that it may establish a communication session of some type with another device. For example, if a person with an advanced mobile handset enters an environment having several network-enabled devices, the handset must be configured before it can establish a communication session with any device in the environment. Even when a handset is preconfigured, it may be difficult for the non-technically inclined person to establish a communication session between the person's handset and another device.

SUMMARY

Computer-based methods and devices for establishing a content mirroring session are described. In some example embodiments, a mobile device, such as a laptop computer or mobile handset, displays a visual indicator when the mobile device is physically positioned and oriented to target another computer device, with which the mobile device is authorized to establish a content mirroring session. The visual indicator, which may be a graphical user interface element such as a button or icon, identifies the device that is being targeted by the mobile device, and in some embodiments, indicates to a user that a content mirroring session can be established with the targeted device. When the mobile device detects an input, indicating the user has requested to establish a content mirroring session with the targeted device, the mobile device communicates a request to establish a content mirroring session. In turn, the mobile device receives a content communication and presents content concurrently with content being presented at the targeted device.

Other aspects of the invention will become apparent from the detailed description that follows.

DESCRIPTION OF THE DRAWINGS

Some embodiments are illustrated by way of example and not limitation in the figures of the accompanying drawings, in which.

DETAILED DESCRIPTION

Figure 1:
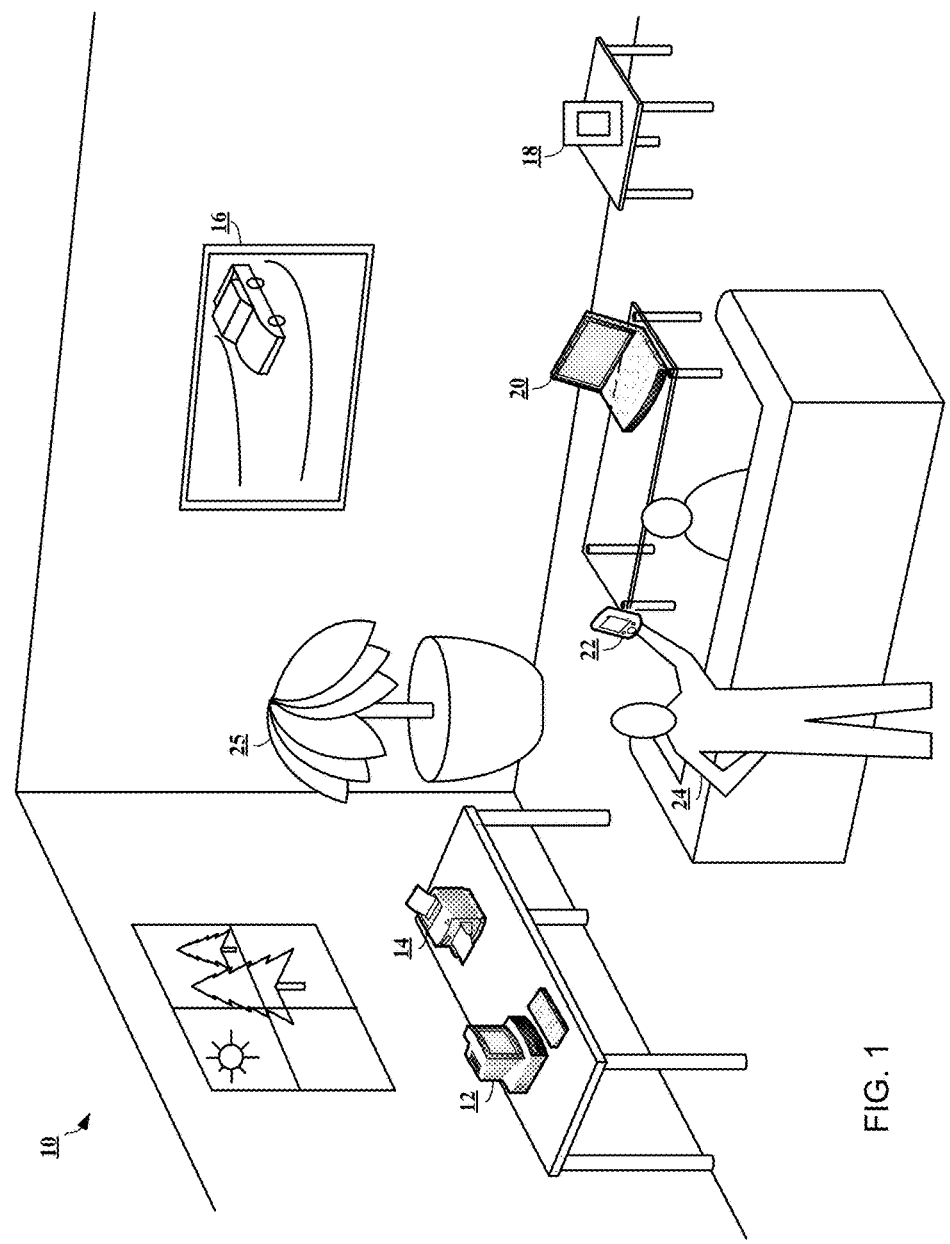
FIG. 1 illustrates a real-world, physical environment including several network-enabled devices that may target, or be targeted, for the purpose of establishing a content mirroring session, according to an embodiment of the invention.

Computer-based methods and devices for targeting, with a mobile computing device, the display of another device, for the purpose of establish a content mirroring session between the devices, are disclosed. In the following description, for purposes of explanation, numerous specific details are set forth in order to provide a thorough understanding of example embodiments. It will be evident, however, to one skilled in the art that the present invention may be practiced without these specific details.

For the purposes of the present application, a content mirroring session is a communication session during which content (e.g., movies, home videos, televisions programming, picture slideshows, application graphical user interfaces, web pages, music or other audio content, and so forth) is presented or accessed (e.g., concurrently, simultaneously, or near simultaneously) on at least two computing devices. Of course, it is not necessary that the same instance of the content be presented on the at least two devices. For example, different instances of the same content (e.g., different copies of the same video or photo) may be presented or accessed during content mirroring. In some embodiments, content mirroring may be achieved by synchronizing respective views of separate instances of the same content on at least two computing devices. As the content may be streamed from a content server, the content server may facilitate the synchronization of the presentation of the content by, for example, providing timing information in a portion of the content information. In such a scenario, the applications responsible for presenting the content at the devices participating in the content mirroring session are responsible for presenting the content at the appropriate time, based on the timing information included in the content. In some embodiments, the source of the content may be one of the computing devices participating in the content mirroring session. In such a scenario, the device that is the source of the content may provide the synchronization mechanism. In other embodiments, content mirroring may be achieved by communicating a view of content from one computing device to another computing device.

A content mirroring session can occur in the context of any number and variety of software applications or computing devices. For example, video applications for presenting video content may participate in a content mirroring session. A web browser application, photo sharing application, or just about any other application that has a graphical user interface can participate in a content mirroring session. Additionally, an audio application for playing music, recorded speech, or other audible information, may participate in a content mirroring session. In some embodiments, the source of the content that is presented at the two devices participating in the content mirroring session is a separate computing device, such as a content server. For example, in some embodiments, a content server will coordinate the streaming of content to the two or more devices participating in a content mirroring session. Alternatively, the source of the content being presented in a content mirroring session may be one of the computing devices participating in the content mirroring session. For instance, a flat panel display with a built-in or connected media player (e.g., DVD player or similar media device player) that is participating in a content mirroring session may communicate content directly to a mobile device during a content mirroring session.

Consistent with some example embodiments, a mobile computing device—or simply "mobile device"—includes real-time targeting logic to determine when the mobile device is targeting another device. When the mobile device determines, that it is targeting another device, the mobile device displays a visual indicator, which in some embodiments is a user interface element displayed on a display of the mobile device. The visual indicator conveys to a user of the mobile device that the mobile device is targeting another device and that the mobile device, or a user of the mobile device, is authorized to establish a content mirroring session with the device being targeted. In addition, the visual indicator may convey to the user the identity (e.g., name and/or type) of the device being targeted. After the mobile device detects that it is targeting another device with which the mobile device is authorized to establish a content mirroring session, a request is communicated to establish the content mirroring session. In some embodiments, the request to establish the content mirroring session is sent in response to the mobile device detecting an input, or series of inputs. Finally, the mobile device receives a content communication and presents content on the at the mobile device, while the content is simultaneously being presented at (e.g., on a display) the targeted device.

FIG. 1 illustrates a real-world, physical environment including several network-enabled devices that may be targeted for the purpose of establishing a control interface session, according to an embodiment of the invention. The physical environment of FIG. 1 is a room 10 in which there is a desktop computer 12 and printer 14 atop a desk, a flat-panel display 16 mounted on the wall, a digital picture frame 18 atop a side table, a laptop computer 20 atop a coffee table, and a mobile handset 22 in the hand of a person 24. In this example environment, the personal computer 12, flat-panel display 16, digital picture frame 18, laptop computer 20, and mobile handset 22 represent computing devices that may be targeted by a mobile device for the purpose of establishing a control interface session. As the laptop computer 20 and mobile handset 22 are mobile devices, these devices additionally represent devices that may be used to target other computing devices for the purpose of establishing a control interface session. At least some of the computing devices illustrated in FIG. 1 are network-enabled devices having the ability to communicate information (e.g., electronically stored data) with other computer devices via one or more wired or wireless networking technologies.

As used herein, the term "targeting" means to position a mobile device, both in terms of its location and orientation, so as to physically aim or point the mobile device at another object or device. The particular mechanism by which a mobile device determines that it is targeting another device may vary. For instance, in some embodiments, the mobile device includes one or more sensors for determining the mobile device's location and orientation. With location logic and orientation logic for analyzing the mobile device's orientation at a particular moment in time when the mobile device's location relative to another device is known, the mobile device can determine whether it is pointing in the direction of the other device. In some embodiments, the mobile device includes an image sensor and object recognition logic. In such an embodiment, the mobile device determines it is targeting another device when object recognition information for the other device is detected in an image captured by the mobile device.

When using a mobile device with location and orientation sensors to target another device, the particular orientation that a device must have relative to the location of the targeted device may vary in different embodiments. For example, in some embodiments, a mobile device is held generally horizontal, or parallel to the ground, when attempting to target another device or object. Alternatively, in some embodiments, a mobile device is held generally vertical, or perpendicular to the ground, in order to target another device. In some embodiments, the particular orientation of the mobile device required to target another device or object is a configurable option, such that the mobile device can be configured to target other devices in an orientation that is generally horizontal, or alternatively, generally vertical, or in some other predetermined orientation.

In those embodiments that utilize object recognition technology to determine if the mobile device is targeting another device, targeting is dependent upon pointing or aiming the image sensor of the mobile device in the direction of the device to be targeted. For example, in some embodiments, a mobile device includes an image sensor (e.g., camera) and real-time targeting logic with object recognition logic.

Images captured by the image sensor are analyzed by the real-time targeting logic by comparing the captured images with object recognition information for various devices or objects within the environment. A mobile device determines that it is targeting another device when the mobile device recognizes an image of a known object or device (e.g., a flat panel display, a desktop computer, or other device or object) based on the known object's or device's object recognition information.

Before another device can be targeted by the mobile device, the mobile device must have or obtain location information or object recognition information for the device to be targeted. In some cases, the mobile device may have previously obtained the location information or object recognition information for one or more devices. In such a scenario, the location information or object recognition information for a device to be targeted in a particular environment may be recalled or read from the mobile device's memory when the mobile device determines that the mobile device is in the general proximity of the device to be targeted.

In some cases, a user may enter a new environment in which there are devices that can be targeted by a mobile device. There are several ways that a mobile device may obtain location information or object recognition information for objects and devices in a new environment. In some embodiments, sensors in the environment detect the presence of the mobile device and automatically initiate a transfer of location information or object recognition information for devices in the environment to the mobile device. For example, the mobile device may include a radio frequency identification (RFID) tag or device, which is read by an RFID reader located in the environment. The RFID reader then reports the presence of the mobile device to a server, or some other computing device, which in turn establishes a communication session with the mobile device and communicates location information or object recognition information for devices in the environment to the mobile device. Alternatively, in some embodiments, the mobile device, upon entering a new environment, requests location information or object recognition information for devices in the environment from a server or other computing device. In some embodiments, to obtain the location information or object recognition information for devices in the new environment, the mobile device communicates location information for the mobile device to a remote server, and the remote server responds with location information or object recognition information for the various devices in the environment. For instance, based on the location of the mobile device, the remote server may communicate an environment model to the mobile device for the environment or location of the mobile device. The environment model may include location information or object recognition information for devices that can be targeted by the mobile device. In addition, the environment model may include authorization information for the mobile device, or the user of the mobile device. This authorization information establishes or provides a user's authority to establish a communication session (e.g., a content mirroring session) with various devices in the environment.

Referring again to FIG. 1, assuming that the mobile handset 22 in the person's hand has already obtained location information or object recognition information for the various computing devices in the room, the person 24 with the mobile handset in hand can target any of the computing devices in the room by simply pointing the mobile handset 22 at a particular computing device. If the person 24 has been granted the authority to interact with another device, when the person 24 aims the mobile handset to target a device with which the person 24 has been authorized to interact, the mobile handset 22 will display a visual indicator that indicates the mobile handset 22 is targeting a particular device, and the user has been authorized to establish an interactive session of some type with the targeted device. Specifically, the mobile handset displays a visual indicator in the form of a user interface element, which indicates the person is authorized to establish a content mirroring session with the targeted device. If, for example, the flat panel display 16 is presenting a movie, a picture slideshow, or some other content, the person can establish a content mirroring session by simply pointing the mobile handset at the flat panel display 16, and selecting or pressing a button or other input mechanism on the mobile handset.

A content mirroring session is a communication session during which content (e.g., movies, home videos, televisions programming, picture slideshows, application graphical user interfaces, web pages, music or other audio content, and so forth) is presented simultaneously on at least two computing devices. A content mirroring session can occur in the context of any number and variety of software applications or computing devices. For example, video applications for presenting video content may participate in a content mirroring session. A web browser application, photo sharing application, or just about any other application that has a graphical user interface can participate in a content mirroring session. Additionally, an audio application for playing music, recorded speech, or other audible information, may participate in a content mirroring session. In some embodiments, the source of the content that is presented at the two devices participating in the content mirroring session is a separate computing device, such as a content server. For example, in some embodiments, a content server will coordinate the streaming of content to the two or more devices participating in a content mirroring session. Alternatively, the source of the content being presented in a content mirroring session may be one of the computing devices participating in the content mirroring session. For instance, a flat panel display with a built-in or connected media player (e.g., DVD player or similar media device player) that is participating in a content mirroring session may communicate content directly to a mobile device during a content mirroring session.

FIGS. 2 through 7 illustrate an example of a mobile handset, and corresponding user interface, for use in targeting a display of another device (e.g., a targeted device) for the purpose of establishing a content mirroring session between the mobile handset and the device being targeted, according to an embodiment of the invention. Each of FIGS. 2 through 7 illustrates a mobile handset (e.g., mobile phone, personal digital assistant, personal media player, or similar device) at a particular point in time, being in a particular location and having a particular orientation with respect to a flat-panel display. FIGS. 2 through 7 illustrate an example of how, in one embodiment, the mobile handset responds to changes in its orientation given its location with respect to the location of another device. In particular the figures illustrate an example of how a graphical user interface is displayed on the mobile handset as the mobile handset is physically manipulated by a person 24 to target a flat-panel display 16 with which the mobile handset has been authorized to establish a content mirroring session. The mobile handset illustrated in FIGS. 2 through 7 has a touch screen display for presenting a graphical user interface and detecting input, such as might occur when a user interacts with the touch screen display. It will be appreciated by those skilled in the art that in various embodiments, input may be received or detected via buttons, touch pads, joysticks, thumb scrolls, or other input devices or mechanisms.

Figure 2:
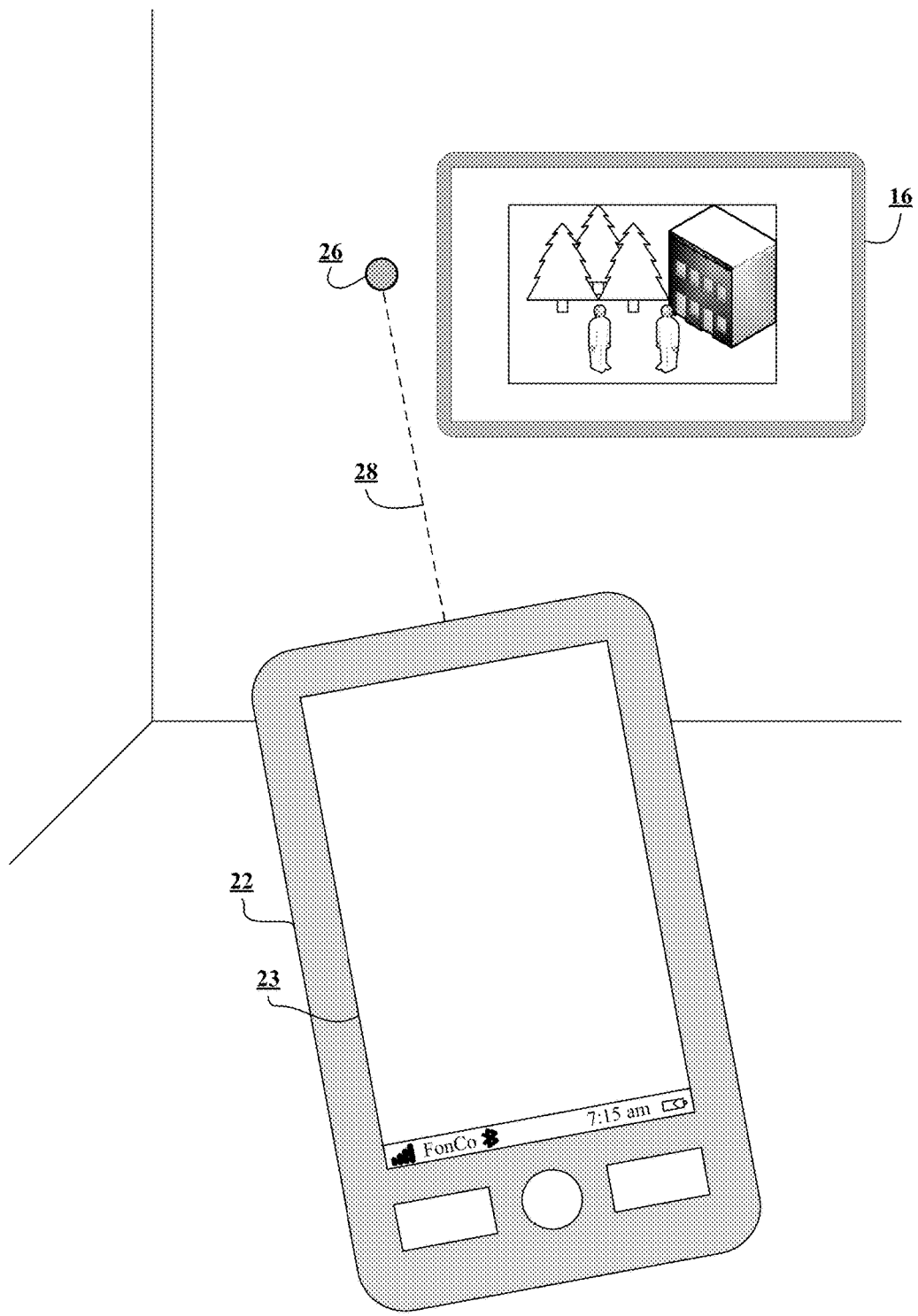
FIGS. 2 through 7 illustrate an example of a mobile computing device, and corresponding user interface, for use in targeting a display of another device for the purpose of establishing a content mirroring session between the mobile computing device and the other targeted device, according to an embodiment of the invention.

As illustrated in FIG. 2, the mobile handset 22 is currently located in front of the flat-panel display 16 and oriented so as to be pointing just to the left of the flat-panel display 16, as indicated by the marker with reference 26. The marker 26 and dotted line 28 connecting the marker 26 with the mobile handset 22 are not visible to persons within the environment of FIG. 2, but instead are provided in the figures to convey the concept of targeting. Because the mobile handset in FIG. 2 is currently located and oriented so as not to be targeting the flat panel display 16, the display 23 of the mobile handset 22 is not providing any relevant visual indication that the mobile handset is targeting another device.

Figure 3:
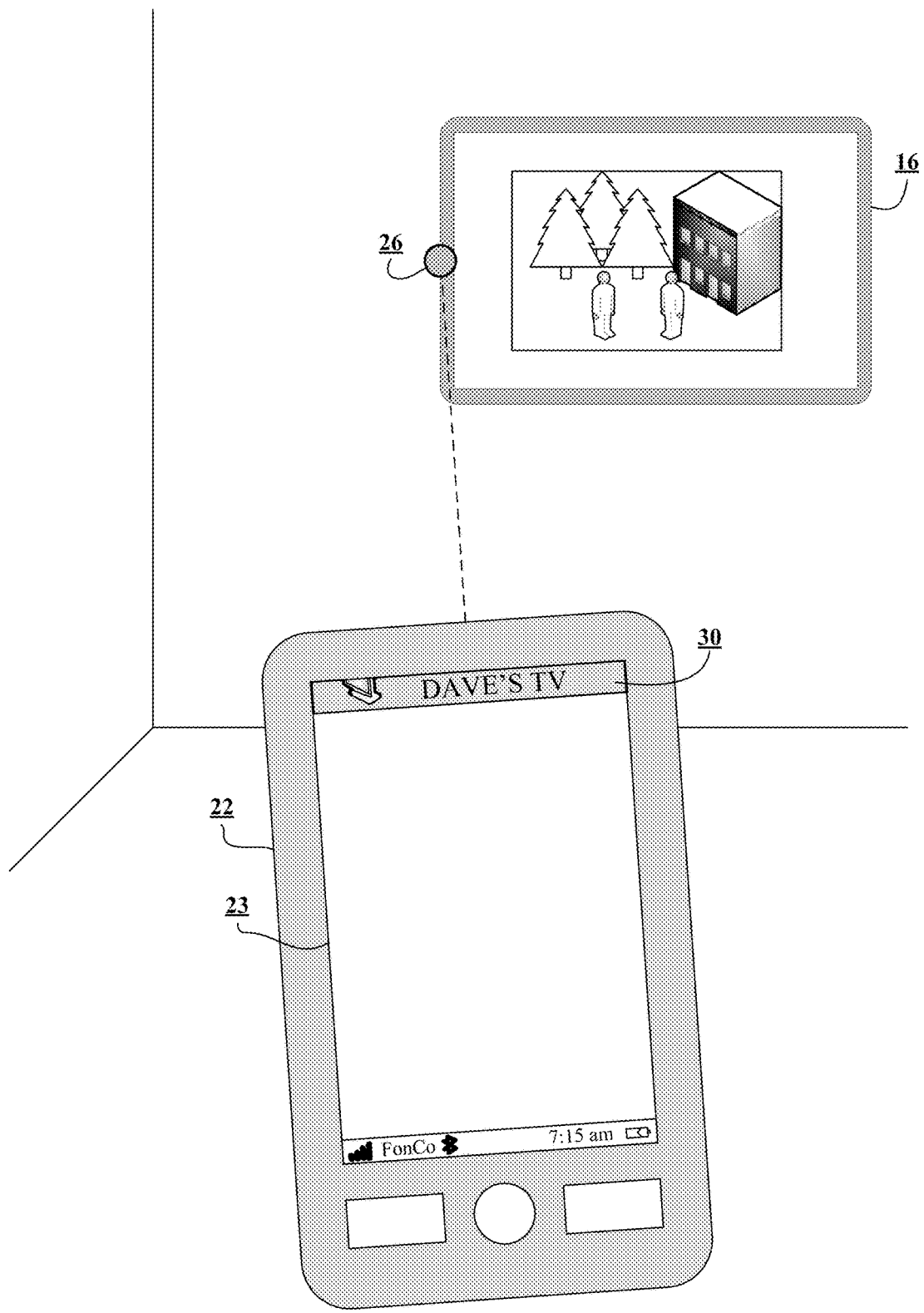

In FIG. 3, the location of the mobile handset 22 relative to the flat panel display 16 has not changed, but the orientation of the mobile handset 22 has changed slightly such that the mobile handset 22 is now aimed at the left outer edge of the flat-panel display 16. As the mobile handset 22 detects the change in its orientation, it determines that it is now targeting the very edge of the flat panel display 16. Accordingly, the mobile handset 22 displays a visual indicator in the form of a user interface element 30 to indicate that the mobile handset 22 is targeting the flat panel display 16. In FIG. 3, the user interface element 30 is only partially displayed to indicate that the mobile handset is targeting the outer edge of the flat panel display 16. For instance, in some embodiments, the visual indicator or user interface element provides a visual indication to the user of how directly the mobile handset 22 is aimed at another device, such as the flat-panel display 16. In FIG. 3, the amount of the user interface element 30 being displayed provides the visual indication of how directly the mobile handset 22 is targeting the flat-panel display 16. In alternative embodiments, another attribute of the user interface element may convey to the user how directly the mobile handset is targeting another device. For example, the color, or color shade, of a user interface element may change to indicate that the mobile handset 22 is targeting a specific portion (e.g., center or middle, outer edge, or somewhere in between) of another device. In yet another embodiment, a number may be displayed to indicate how directly another device is being targeted.

Figure 4:
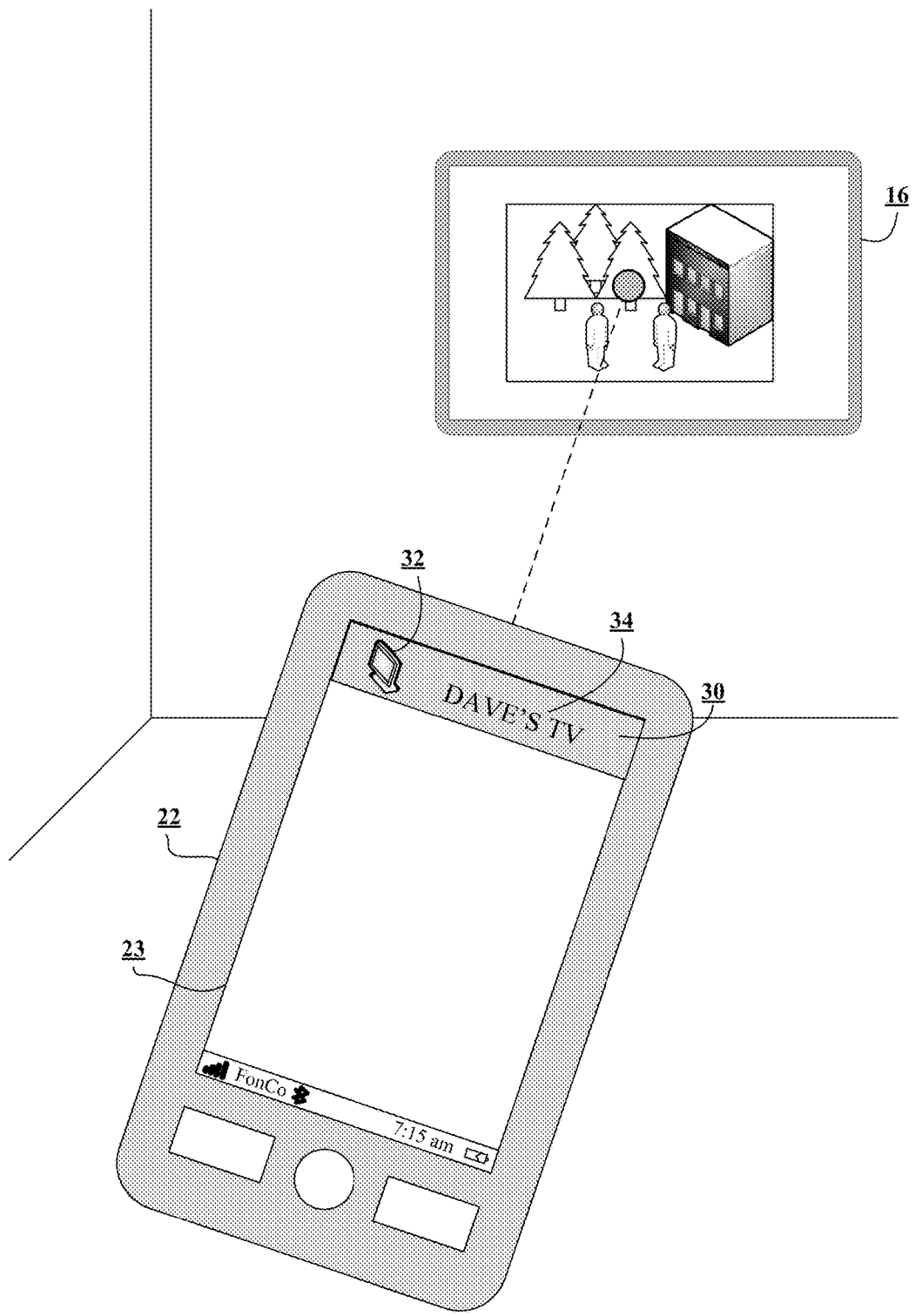

In FIG. 4, the orientation of the mobile handset 22 has again changed, and the mobile handset 22 is now shown to be aimed directly at the middle or center section of the flat-panel display 16. Accordingly, the user interface element 30 with text "DAVE'S TV" is shown in its entirety on the display 23 of the mobile handset 22 to indicate that the mobile handset 22 is targeting the flat panel display 16. The user interface element 30 includes an icon 32 (e.g., a graphical image of a monitor) representing the type of device that is being targeted by the mobile handset 22, as well as a name 34 identifying the targeted device 16. It will be appreciated by those skilled in the art of user interface design that the look and location of the user interface element may vary without departing from the spirit of the invention.

In some embodiments, the user interface element displayed to indicate that a device is being targeted is only displayed when the mobile handset is authorized to interact with the targeted device in some way. For instance, in FIG. 4, the user interface element 30 with text "DAVE'S TV" 34 may indicate that the mobile handset 22, or more specifically a user 24 of the mobile handset 22, has been authorized to interact with the flat-panel display 16, or an application being presented on the flat-panel display 16. Specifically, the user interface element being displayed may indicate that a user of the mobile handset 22 has been authorized to establish a content mirroring session with the flat panel display 16. In some embodiments, when a mobile handset is targeting another device with which it has not been authorized to interact, the mobile handset will not display a visual indicator to indicate that the mobile handset is targeting the device. Alternatively, in some embodiments, when a mobile handset is targeting a device with which it has not been authorized to interact, the mobile handset displays a visual indicator to indicate that the mobile handset is targeting another device, and the mobile handset does not have authority to interact with the targeted device. In such a scenario, the user interface element may be presented in a particular color (e.g., grayed out, or red) to indicate that no content mirroring session, or other interactive session, can be established with the targeted device.

After using the mobile handset 22 to target a device, such as the flat panel display 16, there are several ways that a user might initiate a content mirroring session. For example, in one embodiment, holding the mobile handset steady in the same position (e.g., location and orientation), such that the mobile handset 22 is continually targeting the flat-panel display 16 for a predetermined period of time, will automatically initiate a content mirroring session. Alternatively, the content mirroring session may be established in response to the mobile handset 22 detecting or receiving a particular input, or sequence of inputs. For example, in FIG. 5, the mobile handset 22 has a touch screen display 23. Accordingly, a user initiates a content mirroring session by pressing a finger 36 on the user interface element 30 and "dragging" the user interface element to the center of the mobile handset's display 23, as if pulling the interface of the flat panel display 16 that is being targeted onto the display 23 of the mobile handset 22.

Figure 5:
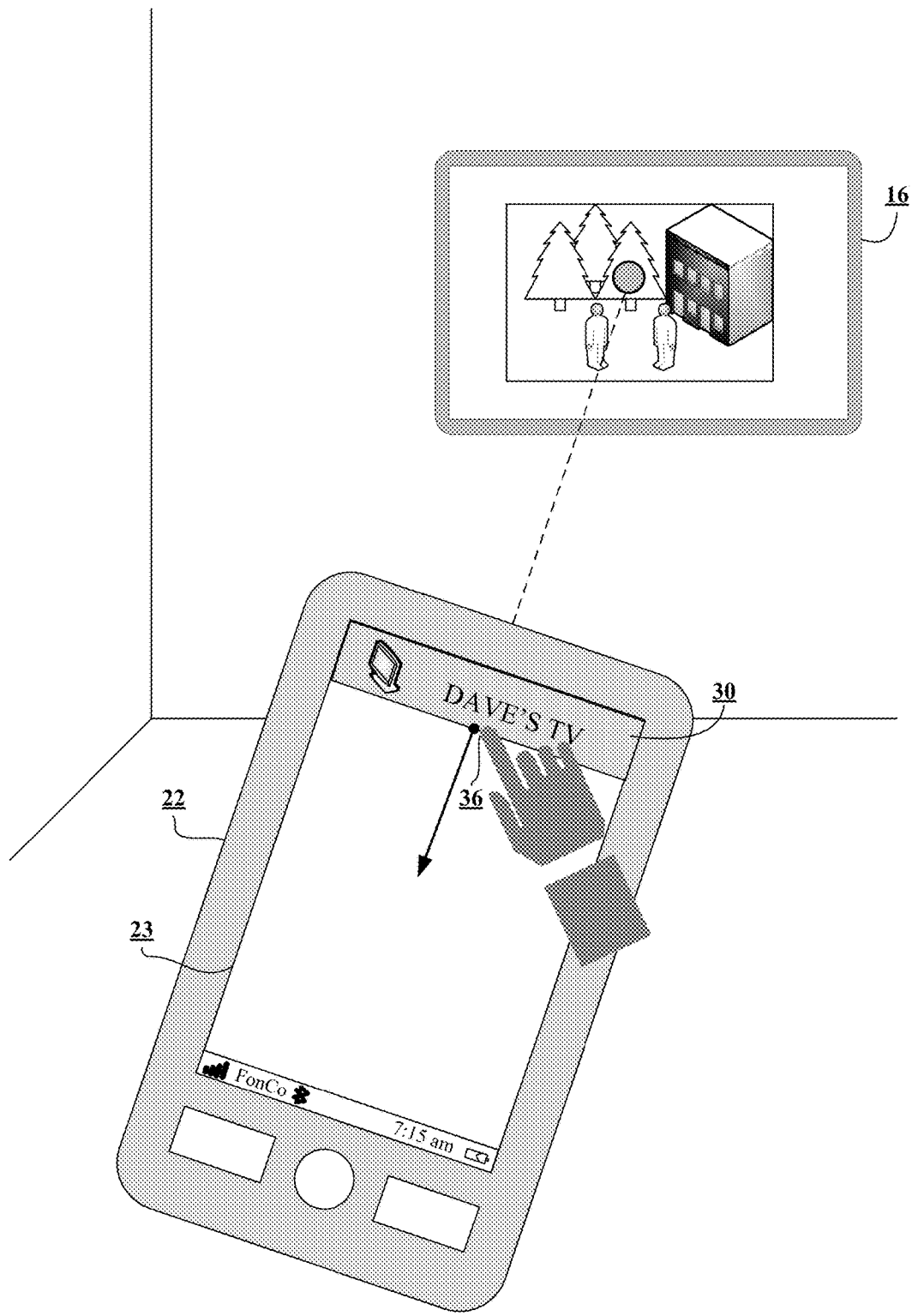
Figure 6:
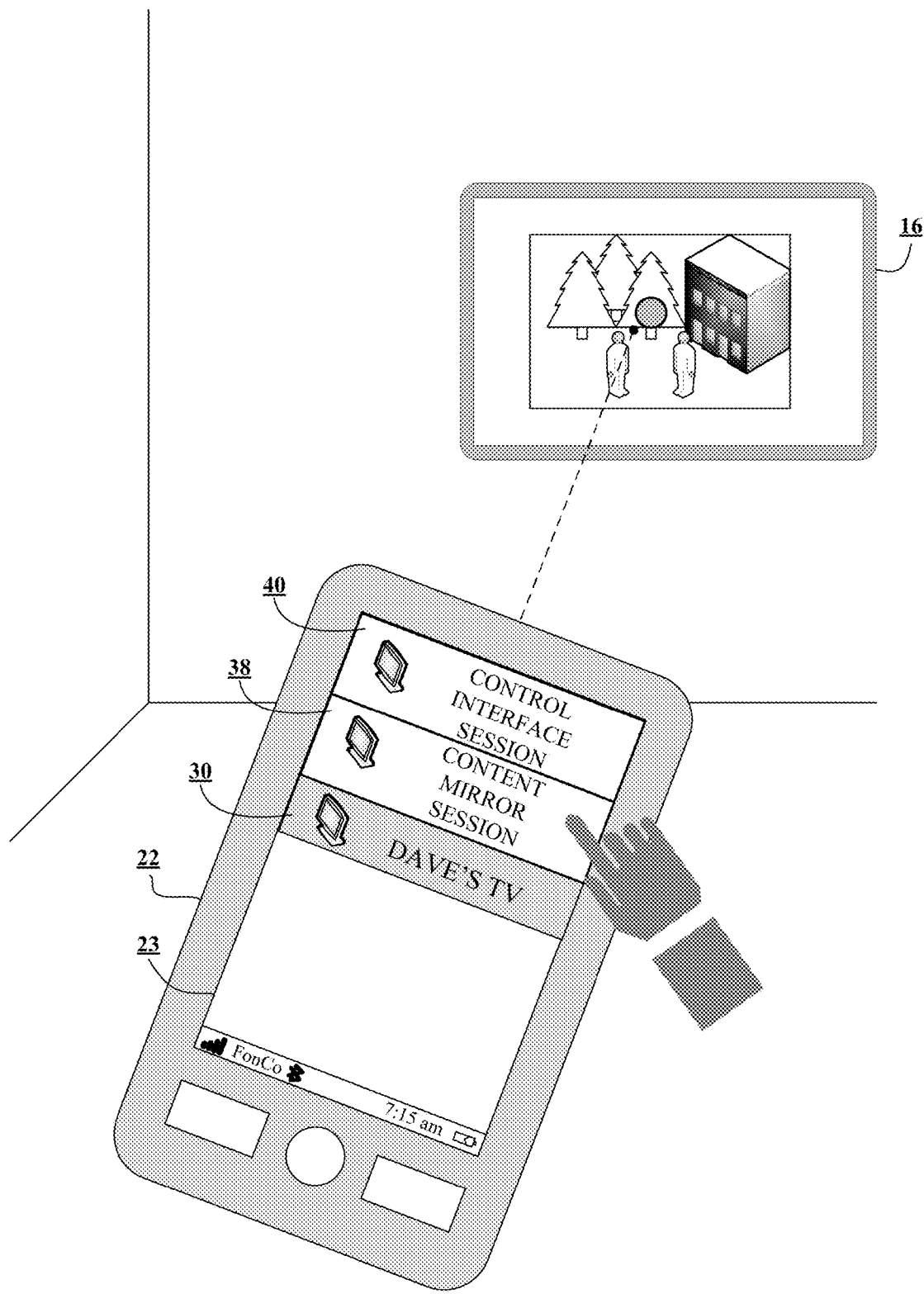

It may be the case that a mobile handset 22 is authorized to interact with another device in more than one way. For instance, a user of a mobile handset 22 may be authorized to initiate more than one type of communication session, such as a content mirroring session, a control interface session, or some other type of communication session. As illustrated in FIG. 6, in such a case, a user may be presented with additional user interface elements enabling the user to initiate different types of communication sessions. The additional user interface elements (e.g., user interface elements 38 and 40 in FIG. 6) may appear as a result of the user interacting in some way with a first user interface element, for example, such as the user interface element with reference number 30 in FIG. 6. For instance, by dragging the user interface element 30 with text "DAVE'S TV" from the top of the display 23 (as shown in FIG. 5) to the middle of the display 23 (as shown in FIG. 6), two additional user interface elements 38 and 40 may be presented, where each additional element corresponds with a type of communication session or interaction that can be initiated with the targeted flat panel display. To initiate a content mirroring session, the user simply selects (e.g., presses) the user interface element 38 (e.g., button) displaying the text "CONTENT MIRROR SESSION."

Figure 7:
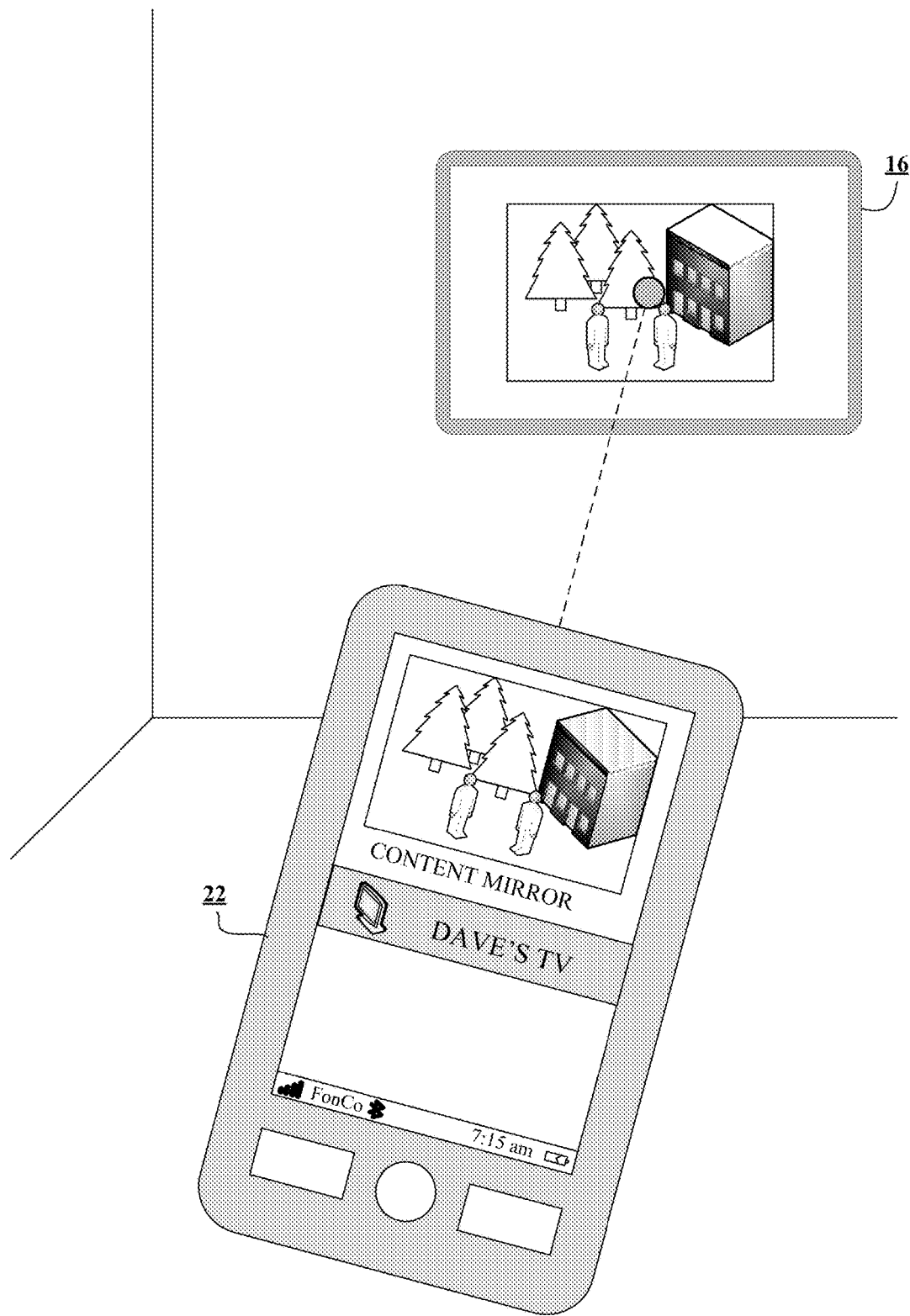

FIG. 7 illustrates an example of a user interface on a mobile handset 22 that is currently participating in a content mirroring session. In some embodiments, after a mobile device has initiated a content mirroring session, it is not necessary that the mobile device continue to target the other participating device in order to continue participation in the content mirroring session. Accordingly, a user may re-orient or re-position the mobile device while continuing to view content mirrored on the flat panel display and the display of the mobile device. In some embodiments, a mobile handset that supports displaying content in both landscape and portrait formats may automatically detect the orientation of the mobile handset and format the mirrored content being displayed on the mobile handset to suit the current orientation of the display.

Figure 8:
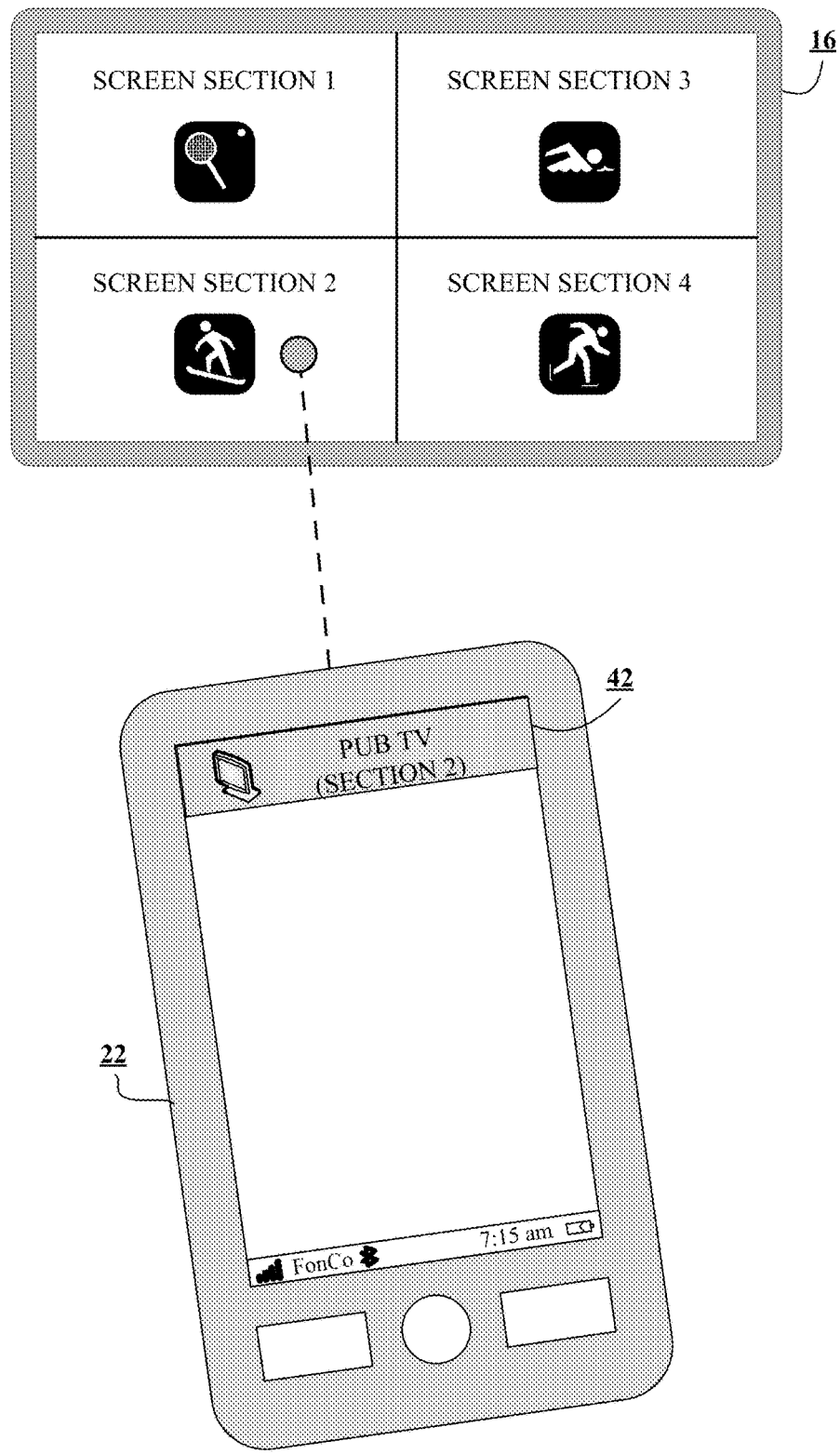
FIGS. 8 through 10 illustrate an example of a mobile computing device for use in targeting a specific portion of a display of another device, for the purpose of establishing a content mirroring session, during which content displayed on the targeted portion of the targeted device is mirrored on the display of the mobile computing device, according to an embodiment of the invention.
Figure 9:
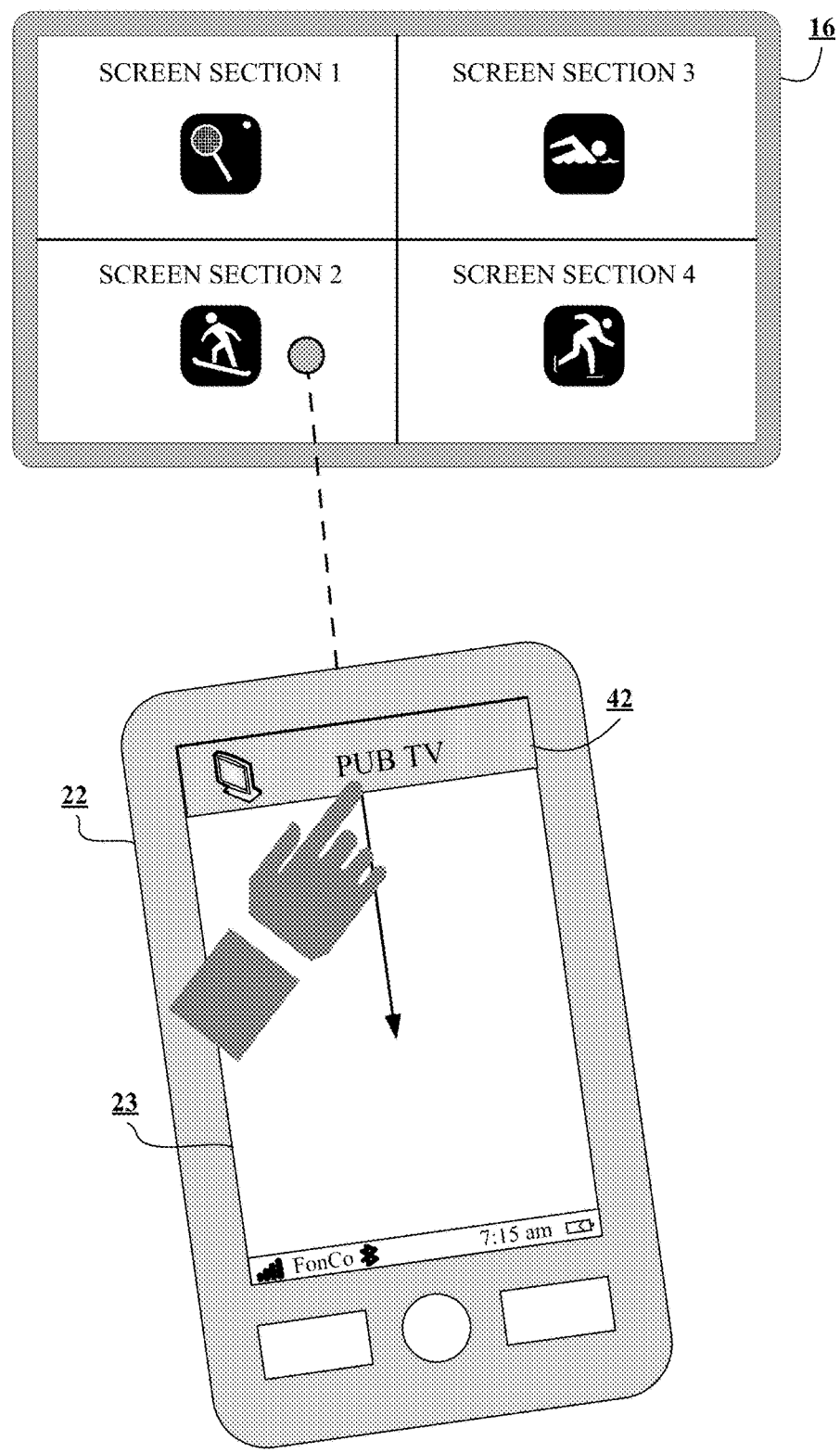
Figure 10:
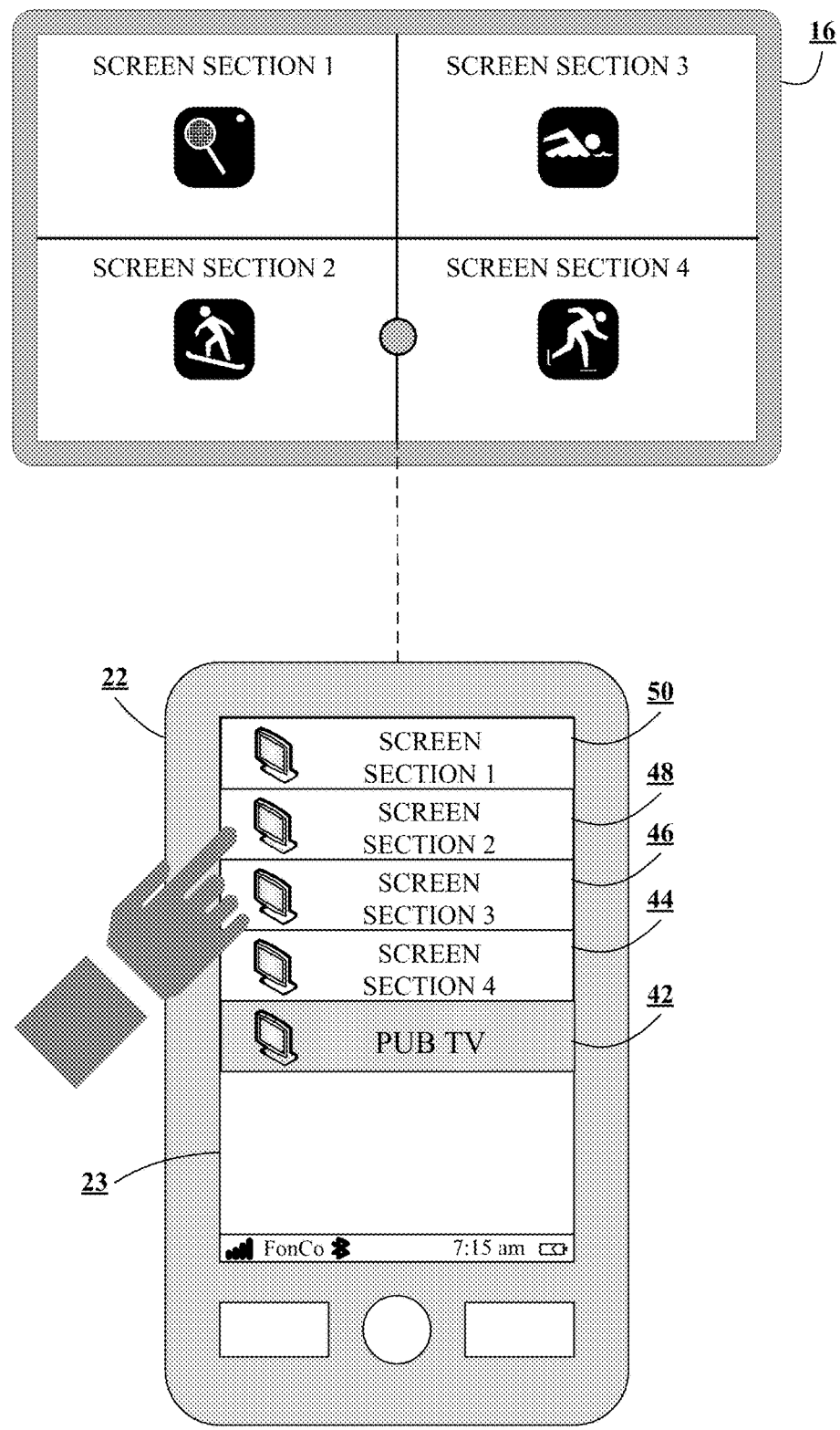

FIGS. 8 through 10 illustrate an example of a mobile handset 22 for use in targeting a specific portion or section of a display of another device, for the purpose of establishing a content mirroring session during which content displayed on the targeted portion of the targeted device is mirrored on the display of the mobile device, according to an embodiment of the invention. As illustrated in FIG. 8, the flat-panel display 16 is presenting content in four different screen sections, with each section displaying different content. For example, the flat-panel display 16 is showing four different sporting events, where one event is shown in each section of the flat-panel display 16. In this example, by targeting a specific section of the flat-panel display 16 with a mobile handset 22, a user can establish or initiate a content mirroring session such that the content being displayed in the targeted section of the flat panel display is mirrored on the display of the mobile handset.

In FIG. 8, the mobile handset 22 is located and positioned so as to be targeting screen section 2 of the flat panel display 16, which in this example, is displaying content associated with snowboarding. Because the mobile handset is targeting screen section 2, the mobile handset 22 is displaying a user interface element 42 identifying the targeted device (e.g., "PUB TV"), and in this case, the screen section of the targeted device that is being targeted (e.g., "(SECTION 2)").

As illustrated in FIG. 9, after targeting screen section 2, to initiate a content mirroring session with the flat-panel display 16, a user presses the user interface element 42 and drags it towards the middle of the display 23 of the mobile handset 22, as if to drag the interface of the flat-panel display 16 onto the display 23 of the mobile handset 22. Of course, in various other embodiments, different inputs may be detected that cause the content mirroring session to be established. For example, the user interface element may represent a button, and to initiate the content mirroring session, a user simply presses the button on the touch screen display. Alternatively, if the mobile handset does not have a touch screen display, a soft key (e.g., programmable key) may be pressed to initiate the content mirroring session.

In some embodiments, a mobile device presents several user interface elements on a display of the mobile device, enabling a user to select a particular item of content being displayed on a targeted device. As illustrated in FIG. 10, the mobile handset 22 is displaying several user interface elements (e.g., 42, 44, 46, 48 and 50). In this case, the user can establish a content mirroring session with a particular section of the flat panel display 16 by pressing the user interface element on the touch screen display 23 that corresponds with a section of the flat panel display 16. For instance, to initiate a content mirroring session with screen section 2, a user simply presses the user interface element 48 with text "SCREEN SECTION 2." In this scenario, it is not required that the user target a specific section of the flat panel display 16. Instead, the user simply targets the flat panel display 16, and then selects a user interface element corresponding with the content that the user desires to be presented (e.g., mirrored) on the mobile handset 16.

Figure 11:
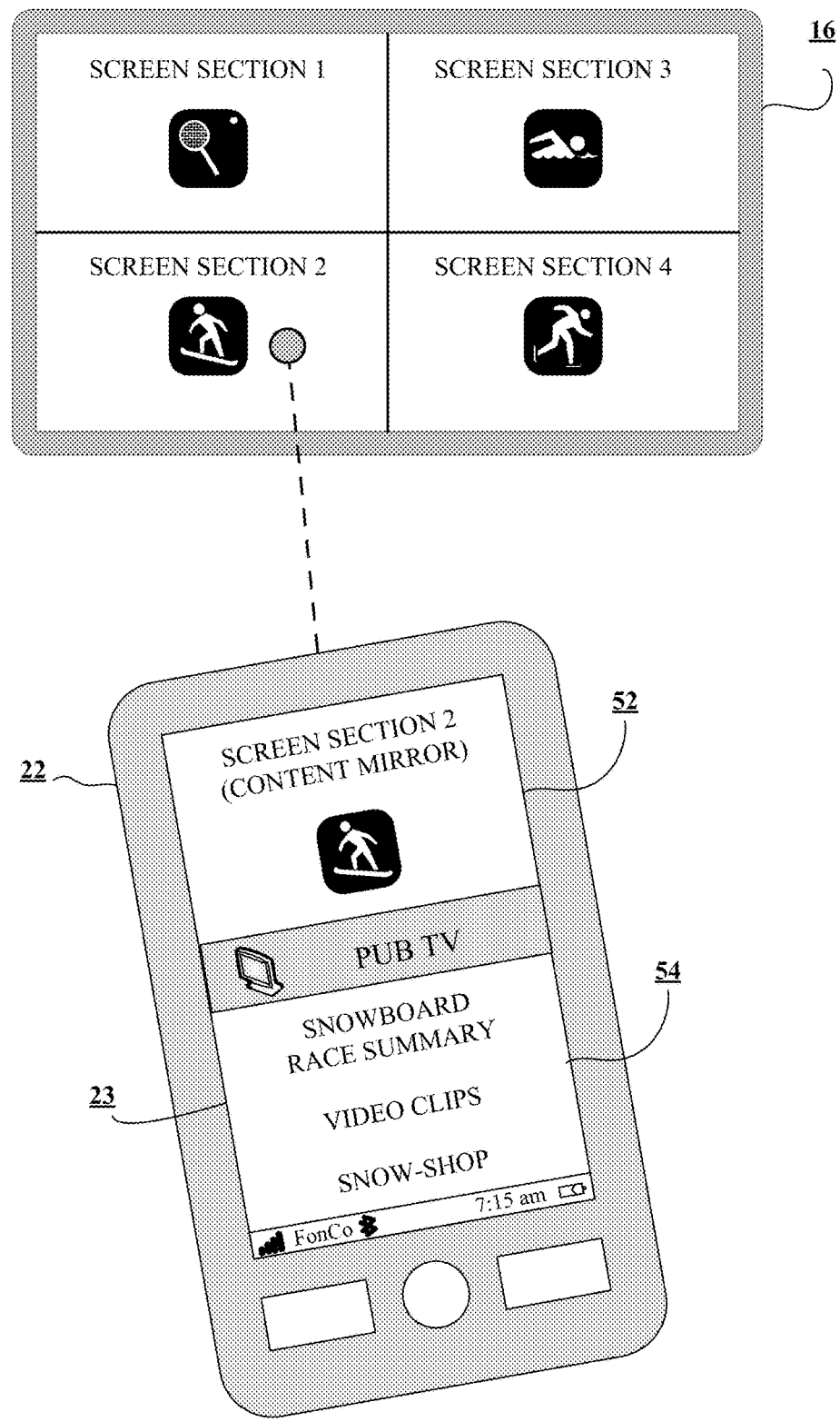
FIGS. 11 and 12 illustrate an example of a mobile computing device for use in targeting a display of another device for the purpose of establishing a content mirroring session between the mobile computing device and the other targeted device, during which the mobile computing device displays on its display both public content (e.g., content mirrored from the targeted device) and private content having some association with or relationship to the public content, according to an embodiment of the invention.
Figure 12:
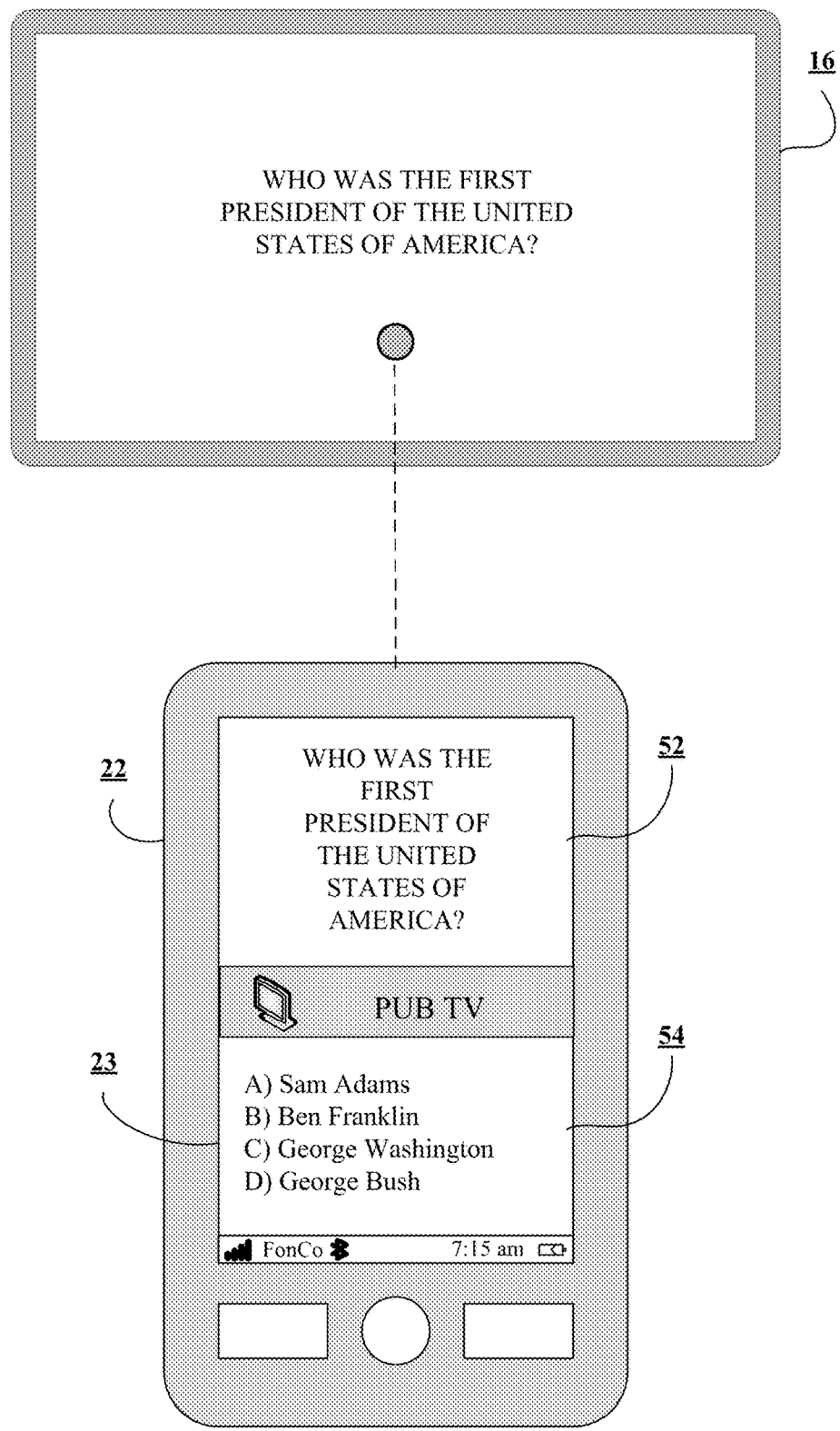

FIGS. 11 and 12 illustrate an example of a mobile device for use in targeting a display of another device for the purpose of establishing a content mirroring session between the mobile device and the targeted device, during which the mobile device presents on its display both public content (e.g., content mirrored from the targeted device) and private content having some association with or relationship to the public content, according to an embodiment of the invention. For example, in FIG. 11, the mobile handset 22 is shown while participating in a content mirroring session with screen section 2 of the flat panel display 16. In this example, screen section 2 of the flat panel display 16 is presenting content associated with snowboarding. The content might be, for example, a live broadcast of a snowboarding event. The content being displayed in screen section 2 of the flat panel display 16 is being mirrored to the top portion 52 of the mobile handset's display 23. In this case, the mobile handset's display 23 has a public space for presenting public content and a private space for presenting private content. The public content in this case is the snowboarding content mirrored from screen section 2 of the flat panel display 16, while the private space 54 is presenting content associated with the mirrored content, but not publicly displayed on the flat panel display. For instance, in this example, the bottom portion of the mobile handset's display is presenting content associated with the snowboarding content being displayed on screen section 2 of the flat panel display. Accordingly, in some embodiments, the user may view interactive content in a private space of the mobile handset display while other content is being mirrored to a public space of the mobile handset's display.

FIG. 12 illustrates an example of a mobile device participating in a content mirroring session as part of a distributed application representing a multi-participant trivia game. For example, the mobile handset 22 shown in FIG. 12 has targeted a flat panel display 16 that is presenting trivia questions. In the public space 52 of the mobile handset display 23, the content (e.g., the trivia question) from the flat panel display 16 is mirrored. In the private space 54 of the mobile handset display 23, the possible answer choices to the trivia question are displayed. Accordingly, a user can interact with the private space of the mobile handset's display 23, and select an answer to the trivia question. By selecting an answer, the answer may be communicated to a server where the application logic for the trivia game is executing.

Figure 13:
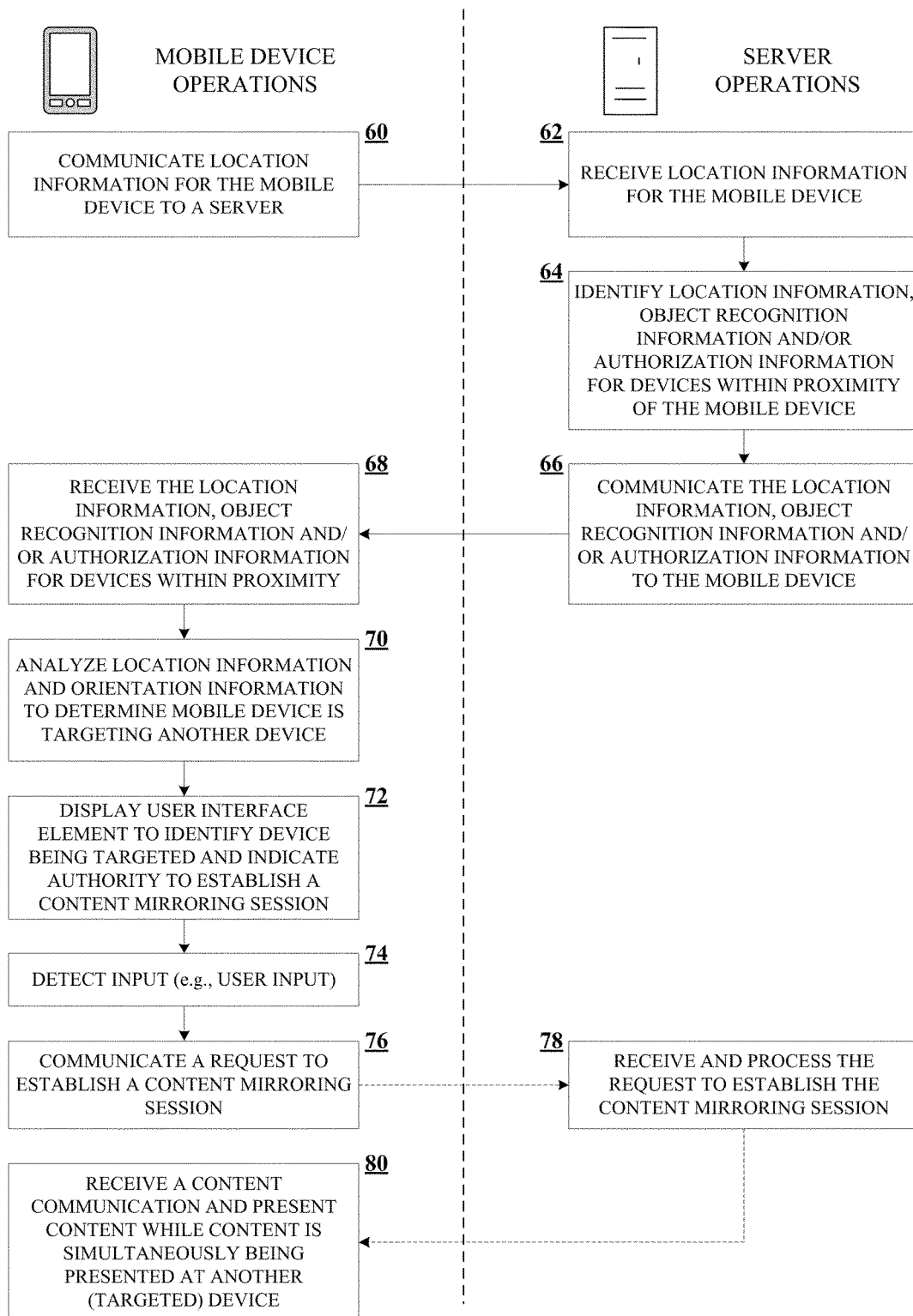
FIG. 13 illustrates a method, according to an embodiment of the invention, for establishing a content mirroring session between a mobile computing device and another device, such as a server.

FIG. 13 illustrates a method, according to an embodiment of the invention, for establishing a content mirroring session between a mobile device and another device. The method begins at method operation 60 when a mobile device communicates location information for the mobile device to a server. For example, a mobile device with a GPS receiver may determine its location, and then communicate its location to a server. Alternatively, a sensor (e.g., RFID reader, or other presence sensor) in the environment may detect the presence of the mobile device and communicate location information identifying the location at which the mobile device was detected to a server.

At method operation 62 the server receives the location information for the mobile device. Next, at method operation 64, the server identifies location information, object recognition information, and/or authorization information for devices within proximity of the mobile device. For example, based on the location information for the mobile device, the server can first determine if other devices are near the mobile device. For those devices determined to be located near the mobile device, the server can look up in a database or otherwise determine location information for those devices. Additionally, the server identifies object recognition information, which can be used by the mobile device to recognize devices in proximity of the mobile device. In some embodiments, the server identifies authorization information, which indicates whether or not the mobile device, or a user of a mobile device, has been granted the authority to interact with another device. In particular, the authority information identifies whether the mobile device or user of the mobile device has previously been granted the authority to establish a content mirroring session with another device. At method operation 66, the location information, object recognition information, and/or authorization information are communicated from the server to the mobile device. The location information and object recognition information and authorization information may be embedded in a three dimensional environment model. Accordingly, the server may simply identify and select the environment model associated with the location of the mobile device, and communicate that environment model to the mobile device.

At method operation 68, the mobile device receives location information, object recognition information and/or authority information for those devices within proximity of the mobile device. Next, at method operation 70, the mobile device analyzes location information and orientation information to determine if the mobile device is targeting another device. For example, based on location information and orientation information received from sensors of the mobile device, the mobile device determines whether or not it is targeting another device in the environment.

At method operation 72, the mobile device displays a user interface element that identifies a device being targeted by the mobile device and indicates that the mobile device has the authority to establish the content mirroring session with the targeted device. At method operation 74, the mobile device detects an input, or series of inputs. In response to detecting the input(s), the mobile device communicates a request to establish a content mirroring session at method operation 76. This request may be communicated to a server that is controlling the display of content at the targeted device. In turn, at method operation 78, the server receives and processes the request to establish the content mirroring session. Finally, at method operation 80, the mobile device receives a content communication (e.g., a communication including content to be presented) and presents content at the mobile device. In one embodiment, presenting content at the mobile device specifically includes displaying content while content is simultaneously being displayed or presented at another targeted device.

As indicated in FIG. 13, in some embodiments, the request to establish a content mirroring session is communicated over a network to a content server that is causing content to be displayed on the targeted device. In this case, the content server may process the request and establish the content mirror by simultaneously streaming content to the mobile device and the targeted device. Alternatively, in some embodiments, the request to establish a content mirroring session may be communicated from the mobile device directly to the targeted device. In this case, the request is processed by the targeted device and the content to be displayed on the mobile device is streamed to the mobile device directly from the targeted device, or a separate local or remote content server.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules or logics that operate to perform one or more operations or functions. The modules and logics referred to herein may, in some example embodiments, comprise processor-implemented modules or logics.

Similarly, the methods described herein may be at least partially processor-implemented. For example, at least some of the operations of a method may be performed by one or more processors or processor-implemented modules or logic. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Figure 14:
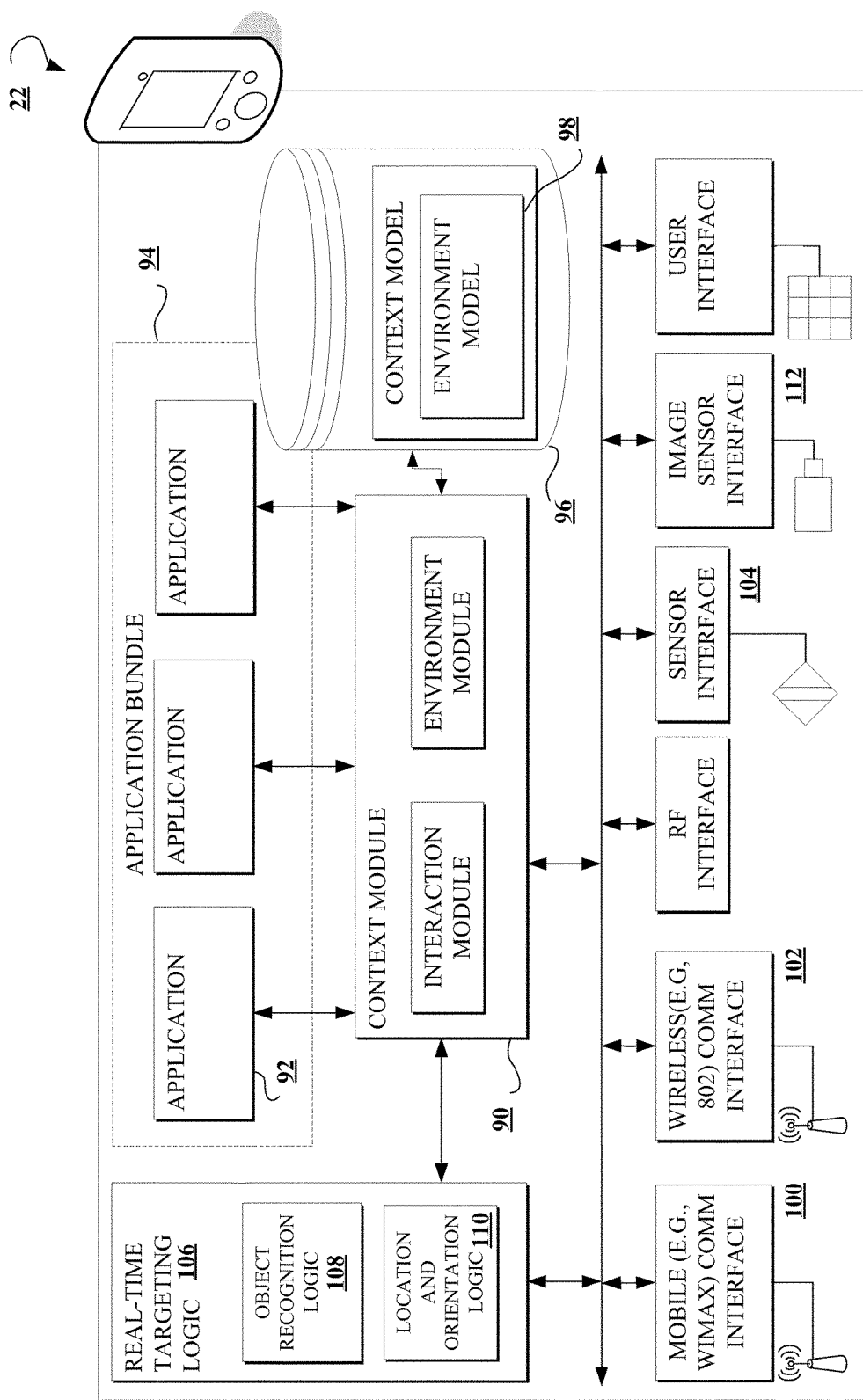
FIG. 14 is a functional block diagram illustrating various logic and functional components included in a mobile computing device, according to an embodiment of the invention, for use in targeting another device for the purpose of establishing a content mirroring session between the devices.

FIG. 14 is a functional block diagram illustrating various functional modules and logics included in a mobile device, according to an embodiment of the invention, for use in targeting another device for the purpose of establishing a content mirroring session. Illustrated is an example mobile handset 22 that includes functionality that enables the mobile handset 22 to interact with other computing devices in general, and establish a content mirroring session in particular. The interactions with other devices may occur in an environment and may represent or comprise a communication session of some type. The various elements illustrated in FIG. 14 may be implemented using hardware, firmware, software, or a combination thereof. Context module 90 includes an interaction module and an environment module. This interaction module may be used to establish a session (e.g., a content mirroring session) on behalf of an application 92 in which the mobile device 22 participates. As shown in FIG. 14, there are several applications included in an application bundle, any one of which may establish a content mirroring session. Example applications include FLASH™ of Adobe Systems, Inc., ACROBAT™ of Adobe Systems, Inc., PHOTOSHOP™ of Adobe Systems, Inc., or some other suitable application. Additionally, the context module 90 may include an environment module that is used to generate a request for environment information—including a request for location information, object recognition information, or authorization information—and to process the environment information.

The context module 90 may be connected to a database 96 which may store environment information, such as location information and/or object recognition information for computing devices in a particular physical environment. Such information may be stored in a three dimensional environment model 98. The mobile handset 22 may include various types of communication interfaces 100, 102 to facilitate data communications with other devices generally, and specifically establishing a session, to communicate with other computing devices.

The mobile handset 22 includes at least one sensor interface 194 for receiving information from a sensor. For instance, the sensor interface 104 may receive location information and/or orientation information from a location sensor or an orientation sensor. This location and orientation information is processed by the real-time targeting logic 106 to determine that the mobile device is targeting a computing device, based on location information for the computing device. The real-time targeting logic includes object recognition logic 108 and location and orientation logic 110. The location and orientation logic 110 process location information and orientation information to determine when the mobile handset 22 is targeting another computing device. Similarly, the object recognition logic 108 processes images received from an image sensor interface 112, which is coupled in some embodiments to an image sensor, such as a camera.

Figure 15:
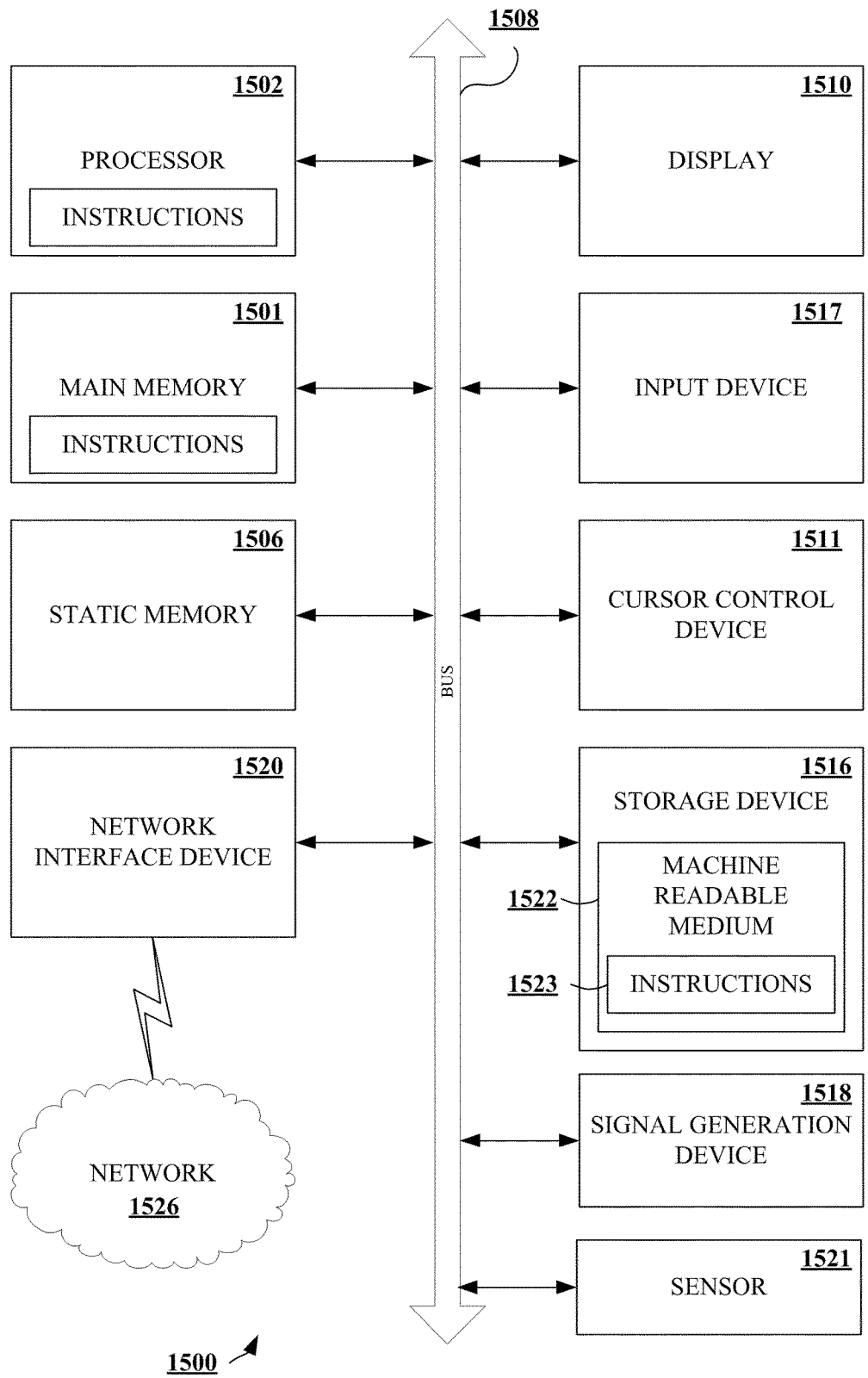
FIG. 15 is a block diagram of a machine in the form of a computing device within which a set of instructions, for causing the machine to perform any one or more of the methodologies discussed herein, may be executed.

FIG. 15 is a block diagram of a machine in the form of a mobile device within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
 determining that a first device is targeting a second device based on a location and an orientation of the first device relative to the second device;
 responsive to determining that the first device is targeting the second device, displaying a user interface element on a display of the first device, the user interface element identifying the second device and indicating that the first device is authorized to establish a content mirroring session with the second device, the content mirroring session involving the simultaneous presentation of content on the first device and on the second device; and
 communicating a request from the first device to establish the content mirroring session with the second device.

2. The method of claim 1, further comprising:
  detecting a user-input at the first device, the request to establish the content mirroring session with the second device being generated as a result of detecting the user-input.

3. The method of claim 1, wherein the determining that the first device is targeting a second device comprises:
  determining a location and orientation of the first device relative to a location of the second device.

4. The method of claim 1, wherein the determining that the first device is targeting a second device comprises:
  analyzing location information for the first device and location information for the second device to determine the location of the first device relative to the location of the second device; and
  analyzing orientation information for the first device in combination with the location of the first device relative to the location of the second device to determine that the first device has a particular orientation with respect to the location of the second device.

5. The method of claim 4, wherein the location information for the first device and the orientation information for the first device are generated by one or more sensors at the first device, and the location information for the second device is read from an environment model associated with a physical environment in which the second device is located.

6. The method of claim 5, further comprising:
  prior to determining that the first device is targeting the second device, communicating location information for the first device to a server and, in response, receiving the environment model from the server.

7. The method of claim 6, wherein the environment model includes location information for a plurality of devices with which the first device has been authorized to establish a content mirroring session.

8. The method of claim 1, further comprising:
  prior to determining that the first device is targeting the second device, communicating location information for the first device to a server, and, in response, receiving information identifying devices i) within a predetermined proximity of the first device, and ii) with which the first device has been authorized to establish a content mirroring session.

9. The method of claim 1, wherein the determining that the first device is targeting a second device comprises:
  analyzing an image received from an image sensor of the first device and object recognition information for the second device to determine that the image sensor captured an image of the second device, or a portion thereof, and that the first device has a particular orientation with respect to the location of the second device.

10. The method of claim 9, further comprising:
  prior to determining the first device is targeting the second device, communicating location information for the first device to a server and, in response, receiving object recognition information for the second device from the server.

11. The method of claim 9, further comprising:
  prior to the determining that the first device is targeting the second device, communicating location information for the first device to a server and, in response, receiving from the server object recognition information for a plurality of devices with which the first device has been authorized to establish a content mirroring session.

12. The method of claim 1, wherein the first device is at least one of a mobile phone, smart phone, personal digital assistant, portable media player (PMP), handheld global positioning system (GPS) device, handheld game device, laptop computer, notebook computer, or netbook computer.

13. The method of claim 1, further comprising:
  receiving content at the first device that is communicated responsive to the request to establish a content mirroring session with the second device; and
  presenting the content using the first device as the content is simultaneously presented using the second device.

14. The method of claim 1, further comprising:
  receiving content at the first device that is communicated responsive to the request to establish a content mirroring session with the second device;
  presenting the content using the first device as the content is simultaneously presented using the second device; and
  presenting additional content using the first device, the additional content being selected based upon the additional content having an association with the content being presented simultaneously by the first and second devices.

15. The method of claim 1, wherein an authorization permitting the first device to establish the content mirroring session with the second device is dependent upon the first device being within a predefined proximity of the second device.

16. The method of claim 1, wherein the content is video content, textual content, graphical content, photographic content, or any combination thereof.

17. The method of claim 1, wherein the simultaneous presentation of content on the first device and second device includes synchronizing respective views of separate instances of the content on the first device and second device.

18. A processor-implemented method comprising:
  receiving, from a first device, location information for the first device;
  analyzing the location information to determine that the first device is in a physical environment that includes a second device with which the first device has authority to establish a content mirroring session involving the simultaneous presentation of content on the first device and second device;
  in response to determining that the first device is in the physical environment, causing display of a user interface element on a display of the first device, the user interface element identifying the second device and indicating that the first device is authorized to establish a content mirroring session with the second device;
  receiving a request to establish a content mirroring session between the first device and the second device; and
  initiating a content communication to the first device so as to enable the first and second devices to concurrently present content.

19. The processor-implemented method of claim 18, further comprising:
  communicating location information to the first device, the location information indicating the location of the second device within the physical environment.

20. The processor-implemented method of claim 18, wherein the determining that the first device is in the physical environment comprises:
  comparing the location information for the first device with location information of the second device to determine that the first device is in a determinable proximity of the second device; and querying authorization information for the second device to determine that the authorization information indicates the first device is authorized to establish a content mirroring session with the second device.

21. A mobile computing device comprising:
a display to present content concurrently being displayed on a display of a second device during a content mirroring session;
a wireless communication interface to exchange information with other computing devices;
real-time targeting logic to determine the mobile computing device is targeting the second device based on a location and an orientation of the first device relative to the second device;
user interface logic to present a user interface element on the display of the mobile device, the user interface element identifying the second device and indicating the mobile device is authorized to establish the content mirroring session with the second device; and
an input device to detect an input, wherein the mobile device causes the wireless communication device to communicate a request to establish a content mirroring session with the second device in response to detecting the input.

22. The mobile computing device of claim 21, further comprising:
a location sensor to generate location information for the mobile device;
an orientation sensor to generate orientation information for the mobile device; and
location logic to analyze location information for the first device and location information for the second device and to determine the location of the first device relative to the location of the second device; and
orientation logic to analyze orientation information for the first device in combination with the location of the first device relative to the second device to determine the first device is pointing in a direction of the location of the second device.

23. The mobile computing device of claim 21, further comprising:
an image sensor to capture images in real time; and
object recognition logic to analyze an image received from the image sensor of the mobile device and object recognition information for the second device to determine the image sensor captured an image of the second device, or a portion thereof, and therefore the mobile device has a particular orientation with respect to the location of the second device.

24. A method comprising:
executing instructions on a first computing device to determine the first computing device is targeting a second device based on a location and orientation of the first computing device relative to the second device;
executing instructions on the first computing device that, responsive to determining that the first computing device is targeting the second device, display a user interface element on a display of the first computing device, the user interface element identifying the second device and indicating that the first computing device is authorized to establish a content mirroring session with the second device; and
executing instructions on the first computing device to communicate a request from the first computing device to establish the content mirroring session with the second device.

* * * * *